Oct. 13, 1942.    P. W. EMLEY    2,298,617

MOTOR CONTROLLER

Filed Jan. 5, 1940

Inventor
Philip W. Emley
By Frank H. Hubbard
Attorney

Patented Oct. 13, 1942

2,298,617

UNITED STATES PATENT OFFICE 2,298,617

MOTOR CONTROLLER

Philip W. Emley, Wauwatosa, Wis., assignor to Cutler-Hammer, Inc., Milwaukee, Wis., a corporation of Delaware Application January 5, 1940, Serial No. 312,553

3 Claims. (Cl. 172—279)

This invention relates to motor controllers and is particularly adapted to the control of variable speed split phase motors which are started by means of a phase shifting condenser which is commutated when the motor has reached the proper speed.

An object of the invention is to provide a system in which a starting condenser is inserted in the circuit of a motor of the aforementioned type during starting and is commutated when the motor speed attains a given value.

Another object is to provide a controller of the aforementioned type which responds to the voltage of the starting winding of the motor.

Another object is to provide a controller which responds to the starting time.

Another object is to provide a controller which starts a variable speed motor at a given voltage and automatically transfers it to a running voltage.

Other objects and advantages will hereinafter appear.

The accompanying drawing is illustrative of several systems embodying the invention.

In the drawing, Figure 1 illustrates a split phase variable speed motor supplied by an adjustable voltage autotransformer in which a starting condenser is cut out of circuit in response to the voltage induced in the starting winding.

Fig. 2 is a modification of the system illustrated in Fig. 1, while

Figure 1:
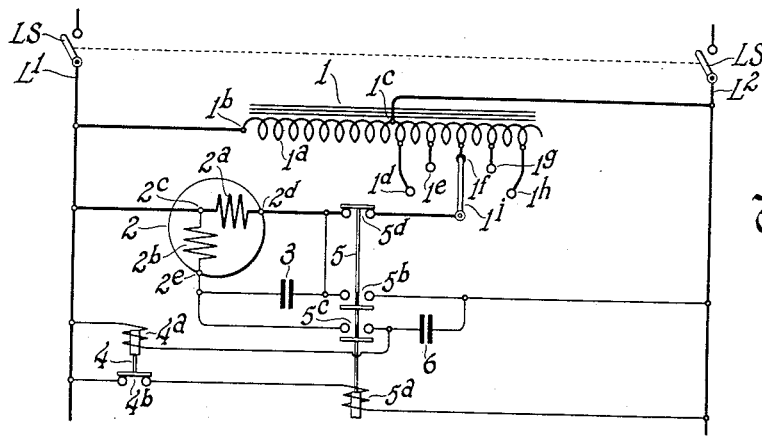

Referring to Fig. 1, the system illustrated therein is supplied with current from a single phase energy supply by the bus bars $L^1$, $L^2$. Connected across the bus bars is the winding $1^a$ of an autotransformer 1 having line terminals $1^b$ and $1^c$, respectively, and voltage adjusting taps $1^d$ to $1^h$, inclusive. A contact lever $1^i$ is adapted to be selectively connected to the taps $1^d$ to $1^h$, inclusive, to thereby vary the voltage which may be impressed upon a split phase motor 2. The motor 2 is provided with a main winding $2^a$ and a starting or auxiliary winding $2^b$. The two windings have a common terminal $2^c$ by which they are connected to the bus bar $L^1$, while a main condenser 3 is connected across the remaining two terminals $2^d$ and $2^e$ of the windings $2^a$ and $2^b$, respectively. The system includes also a relay 4, a main switch 5 and a starting condenser 6. The relay 4 is provided with an energizing winding $4^a$ and normally closed contacts $4^b$. The main switch 5 is provided with an energizing winding $5^a$, normally open contacts $5^b$ and $5^c$, respectively, and normally closed contacts $5^d$.

A circuit extends from the terminal $2^d$, over contacts $5^d$ to lever $1^i$; a second circuit extends from terminal $2^d$, over contacts $5^b$ to $L^2$; a third circuit extends from terminal $2^e$, over contacts $5^c$ and condenser 6 to $L^2$; a fourth circuit extends from $L^1$ through winding $4^a$ to the common point of contacts $5^c$ and condenser 6; a fifth circuit extends from $L^1$ over contacts $4^b$ and winding $5^a$ to $L^2$; and a sixth circuit extends from terminal $2^e$, through condenser 3, contacts $5^d$ to lever $1^i$.

The system described operates as follows:

When it is desired to start the motor 2 and operate it at a given speed, the lever $1^i$ is set for the corresponding voltage and the bus bars $L^1$, $L^2$ are energized, as by closure of the line switch LS. This energizes winding $5^a$ through contacts $4^b$ and switch 5 opens contacts $5^d$ and closes contacts $5^b$ and $5^c$. The winding $2^a$ of the motor is thus connected to full line voltage through contacts $5^b$, while winding $2^b$ is also connected to full line voltage in series with condensers 3 and 6 which are connected in parallel circuit with each other through contacts $5^b$ and $5^c$. The winding $4^a$ is connected in parallel with motor winding $2^b$ and as the voltage in the latter winding is low at starting, the relay 4 is unable to attract its armature. Hence contacts $4^b$ remain closed until the motor has speeded up and the voltage in winding $2^b$ is sufficiently high to cause relay 4 to open its contacts $4^b$, whereupon the switch 5 is deenergized. As a result, the contacts $5^b$ and $5^c$ open and contacts $5^d$ close, thus disconnecting the winding $2^a$ from line voltage and connecting it to the voltage of the transformer switch. At the same time the condenser 6 is disconnected from the winding $2^b$ and is connected in series with winding $4^a$ across $L^1$, $L^2$, so that the latter winding remains sufficiently energized to maintain contacts $4^b$ open until the bus bars $L^1$, $L^2$ are again deenergized. Thus the motor 2 is transferred to running connections. Should it be desired to alter the speed of the motor it is only necessary to change the adjustment of the contact lever $1^i$.

Figure 2:
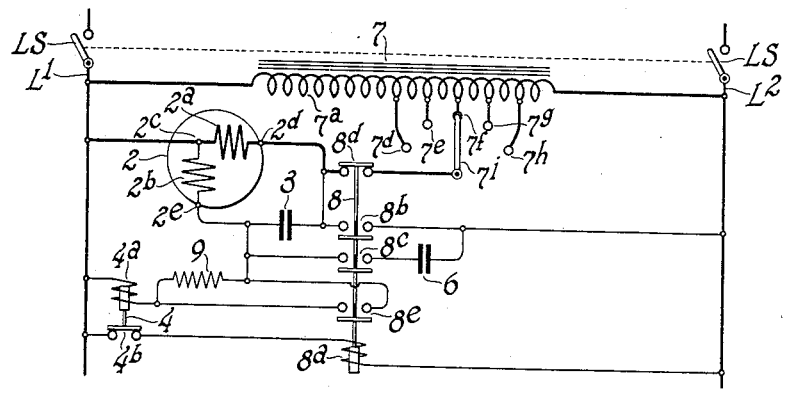

The system illustrated in Fig. 2 has an autotransformer 7 which is provided with intermediate taps $7^d$ to $7^h$, all of which reduce the voltage supplied to the motor below the supply voltage. A switch 8 which commutates the motor and the starting condenser circuits is provided with an energizing winding $8^a$, normally open contacts $8^b$, $8^c$ and $8^e$ and normally closed contacts $8^d$. A resistor 9 is connected in series with the winding $4^a$ between $L^1$ and terminal $2^c$ of starting winding $2^b$ and contacts $8^e$ are adapted to short circuit said resistor.

When the bus bars $L^1$, $L^2$ are energized current flows from $L^1$ over contacts $4^b$, winding $8^a$ to $L^2$ and the switch contacts $8^e$ close to short circuit resistor 9, so that winding $4^a$ is directly connected in parallel with starting winding $2^b$. Also contacts $8^b$ and $8^c$ are closed, thereby connecting winding $2^a$ across the supply bus bars and connecting condensers 3 and 6 in parallel with each other and in series with winding $2^b$ across the supply. As the motor speed increases relay 4 opens its contacts which deenergizes switch 8, thereby cutting condenser 6 out of circuit and connecting the motor winding to the transformer tap selected by lever $7^1$, the motor current after flowing through windings $2^a$ and $2^b$ and condenser 3 passing through contacts $8^d$, lever $7^1$ over the preselected portion of transformer winding $7^a$ to $L^2$. Relay 4 is maintained in the attracted or operated position thereof by current passing through the winding $4^a$ thereof and through the maintaining resistor 9.

Figure 3:
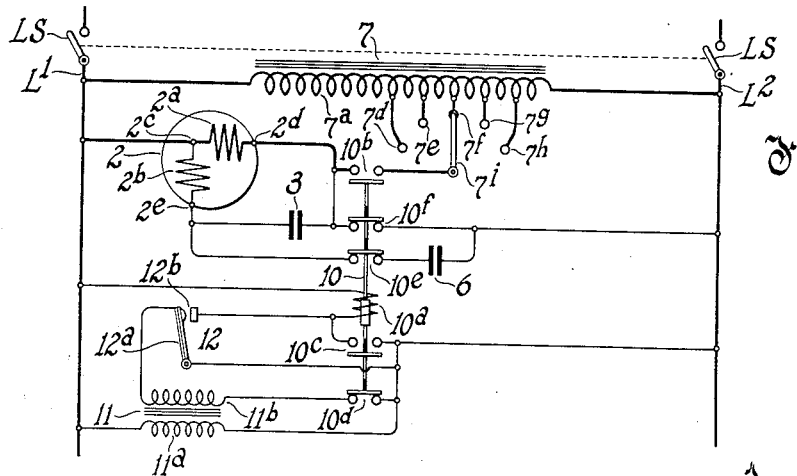
Fig. 3 is a further modification wherein a thermal time element controls the commutation of the circuit from starting to running connections.

Fig. 3 illustrates still another modification in which a thermal timing device is employed to initiate commutation of the motor winding and starting condenser circuits. The system is provided with a switch 10, having an energizing winding $10^a$, normally open contacts $10^b$ and $10^c$ and normally closed contacts $10^d$, $10^e$ and $10^f$. There is also provided a transformer 11, having its primary winding $11^a$ connected across the supply bus bars $L^1$, $L^2$ while the secondary winding $11^b$ is connected in series with the contacts $10^d$ and a bimetallic element $12^a$ of a thermal relay 12 which is also provided with normally open contacts $12^b$. When the bus bars $L^1$, $L^2$ are energized current flows from $L^1$ through the winding $2^a$, over contacts $10^f$ to $L^2$. Another circuit extends from $L^1$ over winding $2^b$, condenser 3, contacts $10^f$ to $L^2$, and, in parallel with the condenser 3 and contacts $10^f$, over contacts $10^e$ and condenser 6 to $L^2$. The transformer 11 is also energized and its secondary current flows through bimetallic element $12^a$ and contacts $10^d$, heating the former. After a given time the element $12^a$ heats up and reflexes, ultimately closing contacts $12^b$, thereby energizing switch 10 by current flowing from $L^1$ over winding $10^a$, contacts $12^b$ to $L^2$, the switch thereby closing contacts $10^c$ which parallel contacts $12^b$ and thus maintain the switch in its attracted position. The contacts $10^d$ open at the same time, thereby interrupting the heating current in the strip $12^a$ and permitting the latter to return to its normal position and open contacts $12^b$. The switch also opens contacts $10^e$ and $10^f$ which disconnects the condenser 6 from circuit and the motor from the line, respectively, while the closure of contacts $10^b$ connects the motor windings to the selected transformer tap.

It will be obvious that in the running position the auxiliary winding of the motor may be entirely cut out of circuit or may be left connected to the starting voltage tap of the system, depending upon the specific requirements of the motor employed, while the main winding is commutated as hereinbefore described.

What I claim as new and desire to secure by Letters Patent is:

1. A controller for a variable speed, split phase motor having an auxiliary winding and a main winding and a running condenser connected in circuit with said auxiliary winding, comprising line terminals, a transformer connected to the line terminals and provided with a plurality of selectable output terminals affording different output voltages, the common point of said motor windings being connected to one of said line terminals, a starting condenser, an electromagnetic relay having an energizing winding connected across said line terminals in series with said starting condenser, an electromagnetic switch having an energizing winding, said relay having a set of normally closed contacts in series with said switch winding, said contacts when closed providing a circuit connection for the switch winding across said line terminals for energization thereof, said switch having a set of normally closed contacts and a plurality of sets of normally open contacts, means including said normally closed switch contacts when closed to provide a circuit connection for said motor windings to one of said selectable output terminals, and means including one set of said normally open contacts to connect said motor windings across said line terminals upon energization of said switch winding, and means including a second set of said normally open contacts to connect said relay winding in parallel with said auxiliary winding and said starting condenser in parallel with said running condenser upon energization of said switch winding.

2. An automatic starting device for single phase, speed regulated, condenser type motors comprising, in combination, a motor having main and auxiliary windings and a running condenser connected in series with said auxiliary winding, a starting condenser, line terminals, a transformer having connections to said line terminals and a plurality of selectable output terminals affording different output voltages, the common point of said motor windings being connected to one of said line terminals, a voltage relay having its operating winding permanently connected across said line terminals in series with said starting condenser, an electromagnetic switch having an operating winding and sets of normally open and normally closed contacts, said relay having normally closed contacts, said relay contacts being arranged in series with said switch winding and the same when closed providing an energizing circuit for said switch winding pending attainment of predetermined voltage conditions in the motor circuit, means including said normally open switch contacts when closed upon energization of said switch winding to provide circuits connecting said main and auxiliary windings to said line terminals and said starting condenser in parallel with said running condenser to complete the starting connections for the motor, means including said relay contacts when opened upon operating energization of said relay winding to interrupt the energizing circuit of said switch winding to thereby effect reclosure of said normally closed switch contacts and reopening of said normally open switch contacts, means including said normally open switch contacts when opened to insure disconnection of said starting condenser from said auxiliary winding and means including said normally closed switch contacts when closed to effect connection of said main and auxiliary windings to one of the selectable output terminals of said transformer.

3. An automatic starting device for single phase, speed regulated, condenser type motors comprising, in combination, a motor having main and auxiliary windings and a running condenser permanently connected in series with said auxiliary winding, a starting condenser, line terminals, the common point of said motor windings being connected to one of said line terminals, an electromagnetically operable switch having an operating winding and sets of normally open and normally closed contacts, means including said normally open contacts when closed upon energization of said operating winding to effect completion of circuits whereby said starting condenser is connected to said line terminals in series with said auxiliary winding and in parallel with said running condenser, a transformer having connections to said line terminals and a plurality of selectable output terminals affording different output voltages for speed regulation, a voltage relay having its operating winding permanently connected across said line terminals in series with said starting condenser, whereby said relay operating winding is subjected to substantially constant voltage conditions after starting of the motor regardless of the selection of the output terminal on the transformer, said relay having normally closed contacts providing an energizing circuit for the operating winding of said switch, said relay winding when subjected to operating energization opening its normally closed contacts to effect deenergization of the operating winding of said switch, and said switch winding when deenergized effecting reopening of its normally open contacts for disconnection of said starting condenser from said auxiliary winding and simultaneously effecting reclosure of the normally closed contacts of said switch whereby said auxiliary winding and said main winding are connected to a preselected one of the output terminals of said transformer.

PHILIP W. EMLEY.